2,744,003

PROCESS OF PRODUCING COBALT IN FINE POWDER FORM

Felix A. Schaufelberger, Yonkers, and Edward S. Roberts, New York, N. Y., assignors to Chemical Construction Corporation, New York, N. Y., a corporation of Delaware No Drawing. Application November 1, 1952, Serial No. 318,332

1 Claim. (Cl. 75—.5)

This invention relates to the hydrometallurgical production of powdered metal. More specifically, it relates to the chemical production of powdered metallic cobalt. Still more specifically, it relates to the production of powdered metallic cobalt by direct reduction of an aqueous slurry of cobalt carbonate.

In copending applications for United States Letters Patent Serial Numbers 310,953 and 310,954 filed September 23, 1952 now U. S. Patent Nos. 2,711,956 and 2,711,957, respectively by F. A. Schaufelberger, one of the inventors herein, there are described novel methods of separating and recovering cobalt from liquors containing cobalt and nickel. The cobalt product obtained in each of these methods is a substantially nickel-free cobalt carbonate. To obtain a powdered metallic cobalt product, the cobalt carbonate must be further processed.

Dry reduction of cobalt carbonate from other sources is one process which has been previously known. It comprises heating and subjecting dry carbonate to the action of some reducing agent such as hydrogen, carbon monoxide or carbon itself. In spite of numerous techniques employing various types of apparatus, this procedure suffers from certain drawbacks. Temperature control and sintering are problems which make it difficult to obtain a product wholly satisfactory for many powder metallurgical applications. Particular problems appear when the carbonate has been precipitated from solution as in the above mentioned copending applications. One of the more troublesome of these is in material handling, existing because of the finely divided state of the carbonate. Carbonates so-obtained must first be filtered and washed to remove soluble impurities. Resultant wet solids must be then dried and transferred to a reduction chamber. After reduction, the product may again have to be subjected to washing. Because of the nature of the material, these operations are not only difficult, and repetitive, but become unduly expensive.

Another method of treating cobalt carbonate to obtain therefrom a powdered metallic product is by the process described in application for United States Letters Patent Serial No. 276,710 filed March 14, 1952 by F. A. Schaufelberger. As described therein, cobalt carbonate may be dissolved in an aqueous acidic or ammoniacal liquor and treated at elevated temperatures and pressures with a reducing gas. In such a procedure, it is believed to be a metal complex of the cobalt that is reduced to form powdered metallic cobalt. A product of high purity and yield may be so obtained. However, the process entails the use of additional chemical reagents. Furthermore, the amount of cobalt carbonate that can be treated is limited to the extent of cobalt carbonate solubility in the liquor.

It is the primary object of this invention, therefore, to provide a chemical reduction process which is not subject to these various drawbacks. It is a further object of this invention to provide a process for treating cobalt carbonate whereby a product of high purity is obtained. Such a process, moreover, should be simple in operation and require no unusual or expensive equipment.

These objects have been attained in a process that is surprisingly simple but effective. This is especially true when considering that previous known methods of preparing powdered metal by direct gas reduction have been practiced on metal salt solutions. Operability thereof and the extent of metal precipitation is necessarily dependent, therefore, on the solubility of the metal salt in any given liquor. Considering such limitation, the results obtained by the present process are all the more surprising since gas reduction is practiced on a concentrated slurry of the carbonate. The simplicity and effectiveness of the process is particularly outstanding when treating cobalt carbonate as obtained in the above mentioned copending applications.

In general, the process may be simply stated. Cobalt carbonate is first slurried in water. The resulting slurry is then heated to elevated temperatures and pressures and treated with a reducing gas. Treatment is continued for a time sufficient to completely reduce a major portion of the solids. After reduction, slurry is cooled, and product filtered and dried, preferably under an atmosphere of hydrogen.

In general, the origin of the cobalt carbonate employed in the practice of the invention is immaterial. Cobalt carbonate derived from substantially any source may be suitably employed. However, the invention is of particular advantage when practiced on cobalt carbonate obtained in separation and recovery processes such as those described in the above mentioned copending applications. Accordingly, further discussion of the invention will be in conjunction with cobalt carbonate so obtained.

In such procedures, precipitated cobalt carbonate carries with it various impurities. In treating this type of precipitate by dry reduction it is necessary, as described above, to reduce the impurity content by washing prior to reduction. Washing, with its associated difficulties, is eliminated in the present invention since any impurities removed by extensive washing will be solubilized when the carbonate is slurried. The first step, therefore, in the treatment of such a cobalt carbonate precipitate is separation thereof by decantation. This may be followed by washing, if desired, in a similar manner. Since the carbonate is to be slurried, drying as practiced in dry reduction is also eliminated.

The cobalt carbonate is then slurried in water. One of the advantages of this invention is the economy resulting from the fact that quite concentrated slurries may be treated. Slurry, therefore, is made as concentrated as practical. The extent of concentration, however, is governed by other considerations. For instance, since a slurry within the proper limits can be handled as a liquid, the material handling problem encountered in dry reduction is substantially overcome. It is important, therefore, that concentration be controlled so this advantage is not lost. Suspension of the cobalt carbonate in water, moreover, permits intimate contact of the reducing agent with individual particles resulting in a product of fine particle size. This advantage can also be lost by over concentration. In general, it is possible to handle 50% slurries and even higher. However, a preferred concentration range within which all advantages of the invention are obtained to their fullest extent is about 25% to about 40%. The particular manner of slurry preparation forms no part of this invention, and, accordingly, may be practiced in any way suitable.

After preparation of a slurry of the desired consistency, it is subjected to superatmospheric temperature and pressure. Temperatures ranging from as low as 100° F. to as high as 500° F. and even higher may be employed. A preferred range, however, is between about 200° F.

and 450° F. At temperatures much below this, reaction is too slow to be economical. At higher temperatures, any additional advantage gained is offset by added expense incurred in providing equipment capable of withstanding the correspondingly higher temperatures.

Various reducing agents may be employed. However, those which contain sulfur, such as $H_2S$ and $SO_2$, should be avoided since their use may result in formation of products containing sulfur. Hydrogen is a successful reducing agent and, generally, is readily available. Carbon monoxide is a suitable reducing agent although its use results in formation of carbon dioxide. Various hydrocarbons are available, but generally are too inactive. The preferred reducing agent, therefore, is hydrogen.

Introduction of reducing gas may be made at any time before, during or after the desired reducing temperature has been reached. Preferably, however, it is not introduced until carbon dioxide liberated by thermal decomposition of the carbonate has been vented from the reduction vessel. In this way, increased pressure within the reduction vessel created by the presence of $CO_2$ is avoided. Moreover, if the liberated carbon dioxide is to be used, for instance, in the processes of the above mentioned applications, it is desirable to recover the same before it is contaminated with reducing gas.

Reducing gas may be introduced into the reduction vessel in any suitable manner. It may be introduced above the slurry or directly into the body of slurry. Reduction is conducted with simultaneous agitation so as to provide the intimate contact of reducing gas with suspended particles necessary to successful reduction. The means of agitation forms no part of this invention. Accordingly, agitation may be conducted in any suitable manner.

Total reduction pressure may vary, but, generally, will not exceed about 1000 lbs./sq. in. Of the total pressure, at least about 100 p. s. i. g. should be reducing gas partial pressure. Preferably, however, when separating in the preferred temperature range, the total pressure will initially include about 300–600 p. s. i. g. partial pressure of reducing gas.

Reducing conditions are maintained for time sufficient to completely reduce a major portion of the cobalt carbonate. Reduction time depends upon the conditions employed. However, under preferred conditions, reduction will generally be completed to the described extent in about one to two hours or less. Reduced slurry is then cooled, preferably by heat exchange with incoming unreduced slurry. Cooled slurry is filtered and product subjected to drying without necessity of first washing. Drying is preferably conducted in an atmosphere of hydrogen.

The following example will further illustrate the invention.

*Example 1*

Precipitated $CoCO_3$, as obtained by treatment of an ammoniacal cobalt salt solution, is slurried in water to about a 30% pulp density. The slurry is heated to 230° C, and liberated $CO_2$ vented. The heated slurry is then subjected to 500 p. s. i. g. of hydrogen for 90 minutes. The slurry is cooled and filtered and product dried without washing. Dried metallic powder analyzed 99.7% cobalt.

We claim:

A method of producing elemental cobalt as a powder of fine, uniform particle size which comprises: preparing a concentrated slurry of cobalt carbonate suspended in water, the solids content being not more than 50%, treating said slurry by subjecting it to a temperature of 100°–500° F., a pressure not exceeding about 1000 p. s. i. g. and a partial pressure of at least about 100 p. s. i. g. of non-sulfidizing reducing gas whereby said suspended cobalt carbonate is reduced; agitating said slurry during treatment; continuing treatment until reduction is substantially complete; cooling resultant slurry and collecting elemental cobalt.

References Cited in the file of this patent

UNITED STATES PATENTS

| | | |
|---|---|---|
| 1,164,141 | Sulzberger | Dec. 4, 1915 |
| 2,375,506 | Turck | May 8, 1945 |

OTHER REFERENCES

Mellor, J. W.: "A Comprehension Treatise on Inorganic and Theoretical Chemistry," Longmans, Green and Co., London (1935), vol. 14, page 449; (1922) vol. 1, pps. 328 and 329.